(12) United States Patent
Lyman

(10) Patent No.: US 11,262,987 B1
(45) Date of Patent: Mar. 1, 2022

(54) USER INTERFACE ISOLATION VERIFICATION

(71) Applicant: EMC Corporation, Hopkinton, MA (US)

(72) Inventor: Richard B. Lyman, Pleasant Grove, UT (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 125 days.

(21) Appl. No.: 14/983,012

(22) Filed: Dec. 29, 2015

(51) Int. Cl.
*G06F 8/41* (2018.01)
*G06F 8/38* (2018.01)

(52) U.S. Cl.
CPC ............ *G06F 8/423* (2013.01); *G06F 8/38* (2013.01)

(58) Field of Classification Search
CPC .. G06F 11/36; G06F 11/3604; G06F 11/3608; G06F 8/71; G06F 8/75; G06F 8/00–54
See application file for complete search history.

(56) References Cited

U.S. PATENT DOCUMENTS

| | | | | |
|---|---|---|---|---|
| 5,860,011 A * | 1/1999 | Kolawa | ............ | G06F 8/20 717/131 |
| 7,992,135 B1 * | 8/2011 | Wong | ............ | G06Q 30/02 709/224 |
| 8,185,876 B2 * | 5/2012 | Iyer | ............ | G06F 9/44589 717/126 |
| 8,751,466 B1 * | 6/2014 | Tsay | ............ | G06F 17/30864 707/700 |
| 9,058,483 B2 * | 6/2015 | Chen | ............ | G06F 21/577 |
| 9,229,702 B1 * | 1/2016 | Kapulkin | ............ | G06F 8/65 |
| 2007/0299964 A1 * | 12/2007 | Wong | ............ | G06Q 30/04 709/224 |
| 2009/0217245 A1 * | 8/2009 | Iyer | ............ | G06F 9/44589 717/126 |
| 2009/0282477 A1 * | 11/2009 | Chen | ............ | G06F 21/51 726/22 |
| 2010/0180194 A1 * | 7/2010 | Ji | ............ | G06F 8/38 715/234 |
| 2011/0302564 A1 * | 12/2011 | Byers | ............ | G06F 8/36 717/146 |
| 2014/0282453 A1 * | 9/2014 | O'Rourke | ............ | G06F 8/42 717/154 |
| 2015/0227363 A1 * | 8/2015 | Pillgram-Larsen | ....... | G06F 8/65 717/122 |

(Continued)

OTHER PUBLICATIONS

Mickens, James, and Mohan Dhawan. "Atlantis: Robust, Extensible Execution Environments for Web Applications." Oct. 23-26, 2011, ACM SOSP '11, Cascais, Portugal. pp. 1-22.*

(Continued)

*Primary Examiner* — Emerson C Puente
*Assistant Examiner* — Paul V Mills
(74) *Attorney, Agent, or Firm* — Workman Nydegger

(57) ABSTRACT

Systems and methods for developing software applications including user interfaces. A user interface that is developed in a distributed manner may include components or plugins from multiple developers. The plugins can be evaluated prior to approval to determine whether any changes to the plugins are isolated and do not adversely impact other plugins or portions of the user interface. Plugins that are not sufficiently isolated are rejected.

20 Claims, 5 Drawing Sheets

(56) References Cited

U.S. PATENT DOCUMENTS

| | | | | |
|---|---|---|---|---|
| 2015/0378966 | A1* | 12/2015 | McWilliams | G06F 17/272 715/236 |
| 2016/0253625 | A1* | 9/2016 | Casey | G06F 9/44521 717/101 |
| 2016/0292066 | A1* | 10/2016 | Stevens | G06F 11/3624 |
| 2016/0328230 | A1* | 11/2016 | Schneider | G06F 8/75 |
| 2017/0090889 | A1* | 3/2017 | Hale | G06F 8/433 |

OTHER PUBLICATIONS

Identifying and Locating Interference Issues in PHP Applications: The Case of WordPress Laleh Eshkevari, Giuliano Antonio, James R. Cordy, Massimiliano di Penta (Year: 2014).*

Designing for Extensibility and Planning for Conflict: Experiments in Web-Browser Design Benjamin S. Lerner Chapter 5 (Year: 2011).*

Exploring Variability-Aware Execution for Testing Plugin-Based Web Applications Hung Viet Nguyen, Christian Kästner, Tien N. Nguyen (Year: 2014).*

Towards Automatic Client-Side Feature Reuse Josip Maras1, Jan Carlson2, and Ivica Crnkovic (Year: 2013).*

Process Model for Rapid Implementation of Features using Flexible Architecture Juha-Matti Vanhatupa (Year: 2015).*

Transparent Fault Isolation in Plugins using Dynamic Compilation Peter Feiner Angela Demke Brown Ashvin Goel (Year: 2010).*

Word Press Plugin Handbook web.archive.org/web/20150905135522/ https://developer.wordpress.org/plugins/the-basics/best-practices/ (Year: 2015).*

What your plug-in test suites really test: an integration perspective on test suite understanding Michaela Greiler and Arie van Deursen (Year: 2012).*

API-Based and Information-Theoretic Metrics for Measuring the Quality of Software Modularization Santonu Sarkar, Girish Masked Rama, and Avinash C. Kak (Year: 2007).*

* cited by examiner

USER INTERFACE ISOLATION VERIFICATION

FIELD OF THE INVENTION

Embodiments of the invention relate to systems and methods for developing software applications. More particularly, embodiments of the invention relate to systems and methods for developing and evaluating user interfaces of software applications.

BACKGROUND

Software applications provide a tremendous benefit in today's society. Software applications are used to create documents, make purchases, send email, protect data, and manage contacts, to name a few. Software applications are widely available and are used in conjunction with different types of devices such as computers, tablets, and smart phones.

A key aspect of many software applications is the user interface. Most, if not all users, interact with software applications through a user interface that is visually rendered on a display. Users are able to input data, create data, perform searches, make purchases, etc., through the user interface.

Although a user interface may seem simplistic to an end-user, it is often the result of significant work and can be very complicated. For many software applications, many different development teams may contribute to the same user interface.

Because work on the user interface or other aspect of the software application is being done by multiple development teams, there is a need to coordinate and approve changes made to the user interface or to the software application. Conventionally, this can be a lengthy process. In fact, this is one of the reasons that conventional updates occur infrequently: the need to ensure that all of the components and modules of software application work together properly takes time. In particular, there is a need to ensure that the component(s) of the user application or software application developed by one development team do not adversely affect or interfere with the components or portions of the user interface or software application developed by other development teams.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
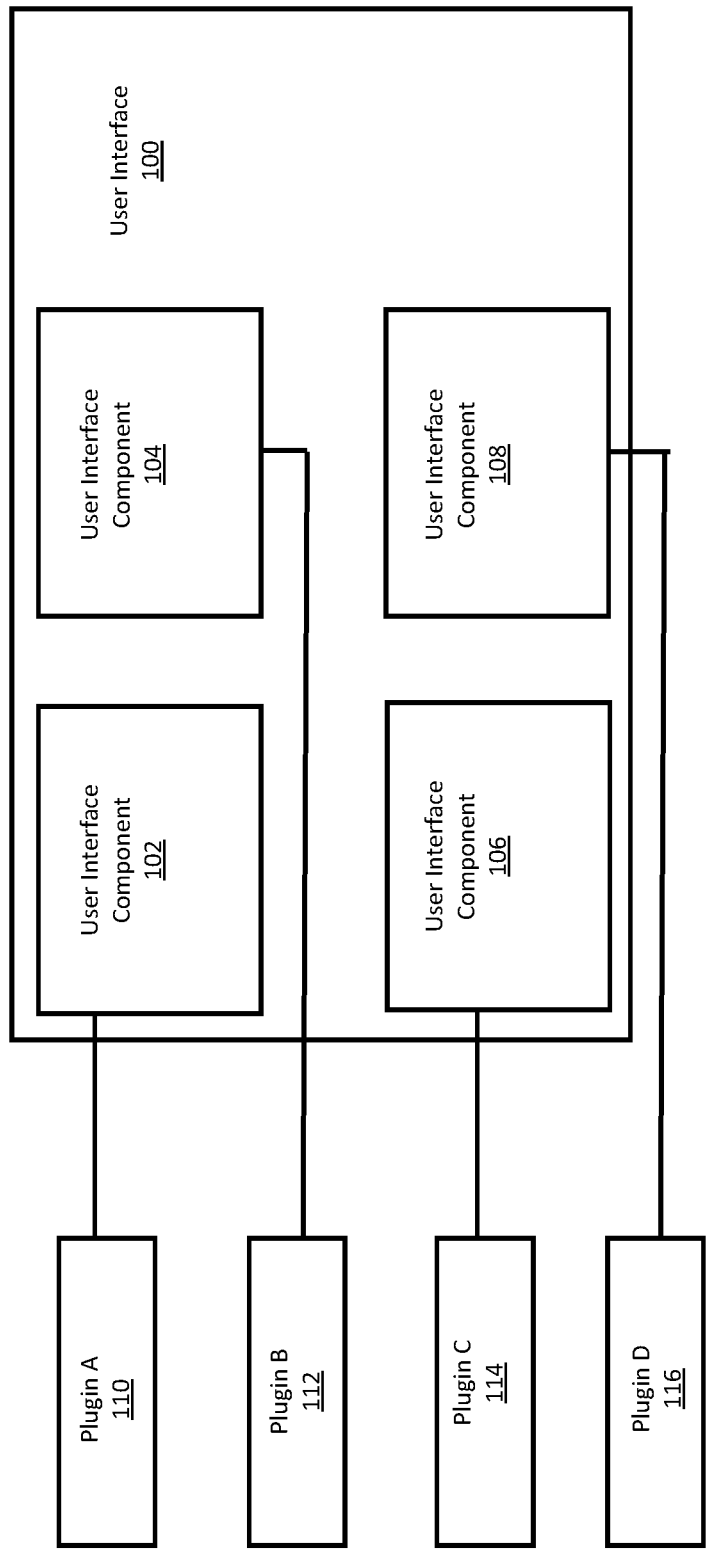
FIG. 1 illustrates an example of a user interface that includes components developed by different development teams.

Embodiments of the invention relate to systems and methods for developing a software application. Embodiments of the invention are discussed in the context of a user interface, but embodiments of the invention may be applied to other components or aspects of the software application. Embodiments of the invention further relate to systems and methods for approving a user interface and to evaluating changes to a user interface or portion of the user interface.

More particularly, embodiments of the invention relate to systems and methods for evaluating a plugin to determine whether the plugin is isolated. A plugin is isolated in the context of the user interface when the plugin does not have an adverse effect on another component or plugin of the user interface. In one example, isolation verification determines whether the plugin has an unintended or unwanted effect on another portion or component of the user interface. If it is determined that the plugin is not isolated, the plugin is rejected for further development. If the plugin is determined to be isolated, then the plugin can be approved and included in a live interface.

A user interface is usually rendered visually on a display device. The user interface can include a large number of different features and characteristics. The information presented on a user interface may also relate to other software executing on a computing device. For example, a backup operation can be launched from a user interface (e.g., in a browser) or by an agent operating on a client. Further, the data to be backed up can also be selected from the same user interface. A user interface can be local and/or remote from the associated source code used to generate the user interface and/or perform other functions of the software applications (e.g., backing up the selected data).

In one example, a user interface may be rendered inside of a browser window. When the software application is a backup application, the data may be backed up in the cloud or at another location. Other cloud services (e.g., online drives, contact management, sales, word processing, social media, or the like) may be associated with similar user interfaces that are delivered over a browser. In some example, a local agent may be executing on the end-user device.

By way of example only and not limitation, a user interface can include input controls (e.g., checkboxes, radio and other buttons, toggles, fields, menus, links, or the like), navigational components (e.g., sliders, search fields, page controls, icons, or the like), informational components (e.g., tips, icons, progress bars, notifications, messages, and the like), containers (e.g., accordions), or the like. A user interface can be used to receive and/or display data. A user interface, as used herein, is not limited to a single page or display but can include multiple displays, multiple pages (e.g., multiple webpages), or the like or combination thereof.

When a user interface is developed, multiple developers or development teams may each contribute to portions of the user interface. Some development teams may be responsible for specific portions of the user interface. Embodiments of the invention fragment the user interface into pieces or components. This allows the user interface to be generated in a distributed manner. Embodiments of the invention can ensure that the distributed components are kept separated even though the distributed components form the user interface as a whole. Collectively, all of the plugins and other components of the user interface are referred to as web assets and the user interface presented to a user is generated from the web assets.

The components of the user interface can be simple in nature or complex. In addition, some components of the user interface may overlap or be related. For example, one team may be responsible for a login page. Another team may be responsible for identifying and displaying the products purchased by an end user. Another team may be responsible for displaying data sets that have been backed up and allow the end user to interact with the backed up data sets. Another team may be responsible for a set of help pages and a search interface. These components of the user interface can be developed in a distributed manner.

A plugin, in one example, refers to the source code associated with a component of a user interface and to the web assets generated from the plugin. When a development team submits a plugin, the associated source code is evaluated to determine whether the source code affects the source code or web assets of other plugins or components of the user interface. Embodiments of the invention can shorten the development process by identifying potential problems with the plugin in an automated manner. The isolation verification process can determine whether the source code of the plugin has the proper scope such that any references made inside the plugin remain inside the plugin. Stated differently, the isolation verification process can help ensure that the source code of the plugin does not impact the source code or resources associated with another plugin or with another development team. In some embodiments, a plugin may be sufficiently isolated even when there are references that go outside of the plugin or in situations where the source code of a plugin has an impact on the source code or resources of another plugin. In one example, a plugin is isolated when its impact or change (whether inside or outside of the plugin) is intended or authorized. Isolation verification may fail when its impact or change is not intended or is not authorized. During isolation verification, references that go outside of the plugin may be flagged for further evaluation to determine if the reference and its effect are intended or authorized. When this is the case, the isolation verification passes.

FIG. 1 illustrates an example of a user interface 100 that is generated from user interface components. The user interface 100 is an example of a user interface that is developed in a distributed manner, for example, using plugins developed by different development teams (which may be geographically dispersed). FIG. 1 illustrates a user interface 100 that includes user interface components 102, 104, 106, and 108. As previously stated, the user interface 100 may include many different pages or displays. In fact, some of the pages may be related. For example, a search box may be related to the results of the search, which may be shown in different pages. For convenience, a single page is illustrated. Further, some components may lead to other pages of the user interface, each of which may be associated with one or more developers.

The components are each associated with a plugin. As used herein, a plugin, once approved, can become part of a live user interface. Each plugin, when processed and added to the web assets of a live user interface, generates at least a portion or component of the user interface. The user interface (UI) component 102 is associated with plugin A 110, the UI component 104 is associated with plugin B 112, the UI component 106 is associated with the plugin C 114, and the UI component 108 is associated with the plugin D 116. The plugins 110, 112, 114, and 116 are examples of web assets used to generate the corresponding components 102, 104, 106 and 108 in the user interface 100.

During development of the user interface 100, a development team A may develop the plugin A 110, a development team B may develop the plugin B 112, a development team C may develop the plugin C 114, and a development team may develop the plugin D 116.

Each plugin corresponds to source code that (when executed) performs a function or purpose in the user interface 100. The plugins 110, 112, 114, and 116 (along with other source code used to render the full user interface 100) are examples of web assets as previously stated. Other examples of web assets include graphics, videos, or the like. Each web asset may be associated with a particular plugin, a group of plugins, or no plugins.

The user interface 100, as a whole, is thus generated from web assets. The web assets may be stored in a directory structure and are used to construct the user interface 100. Each plugin includes source code using one or more languages. The plugins (or portions thereof) A 110, B 112, C 114 and D 116 may be written in different languages. They may also be written in the same language.

When performing isolation verification, the plugins are evaluated to determine their impact on the user interface and/or on other plugins. For example, plugins often include a variety of elements such as variables (local and/or global), strings, selectors, procedures and functions, procedure and function calls, libraries or references to libraries, or the like or combination thereof.

During isolation verification of a plugin, the plugin is evaluated to determine what interactions, if any, exist between the plugin and other plugins or portions of the user interface (or software application). If the plugin includes references to other plugins or makes changes to other plugins or to libraries used by multiple plugins, the isolation verification process may determine that the plugin is not sufficiently isolated. This isolation problem should be fixed or at least manually approved prior to approving the plugin for inclusion in a live user interface.

Figure 2:
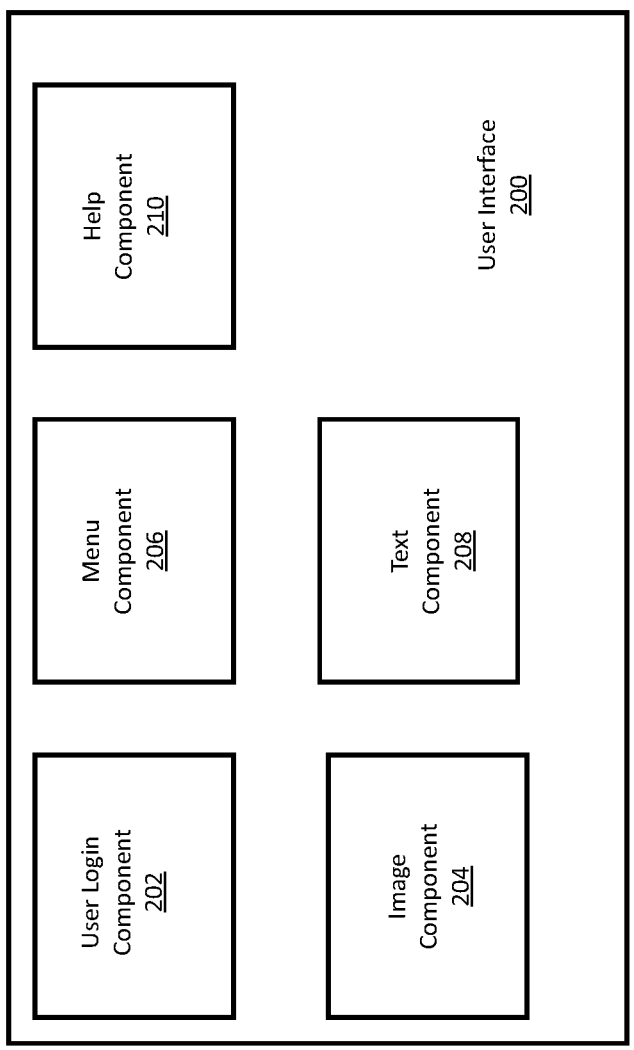
FIG. 2 illustrates an example of a user interface that includes components associated with different development teams.

FIG. 2 illustrates an example of a user interface 200, which is an example of the user interface 100. The user interface 200 includes examples of the components illustrated in FIG. 1. The components shown in FIG. 2 are by way of example only and not limitation. The user interface 200 includes a user login component 202, an image component 204, a menu component 206, a text component 208, and a help component 210. A different development team may be responsible for or associated with the components 202, 204, 206, 208 and 210.

Some of the components may be associated with deeper layers or other pages of the user interface. For example, entering a query into the help component 210 may return a page of results based on the query. In one example, the same development team is responsible for both the help components 210 and the page or pages of results. The results pages may be associated with the same plugin or a different plugin.

During development (e.g., creating the initial version of the plugin, generating a change or update to the plugin) of the plugin, the plugin may be submitted for isolation verification purposes. For example, when an update for the plugin for the help component 210 is received, the plugin is evaluated to determine whether it affects any of the other components of the user interface 200. In one example, the help component 210 is an example of the user interface component 104 and plugin B 112 is an example of the plug in of the help component 210.

Assume, for example, that the evaluation of the plugin of the hello component 210 determines that the plugin of the help component 210 makes a change to the image component 204. This potential problem is detected during the isolation verification process. As a result, the plugin of the help component 210 may be rejected before the plugin is included in the live user interface. When the plugin of the help component 210 (or other plugin) is rejected, the plugin of the help component 210 may be returned to the appropriate developer along with the reason for the rejection. This can shorten the development process because the rejection helps the developer understand the problem quickly. A rejection does not always result in further changes. In some examples, the potential isolation problem may be authorized and acceptable. In this case, the potential isolation problem can be ignored.

Figure 3:
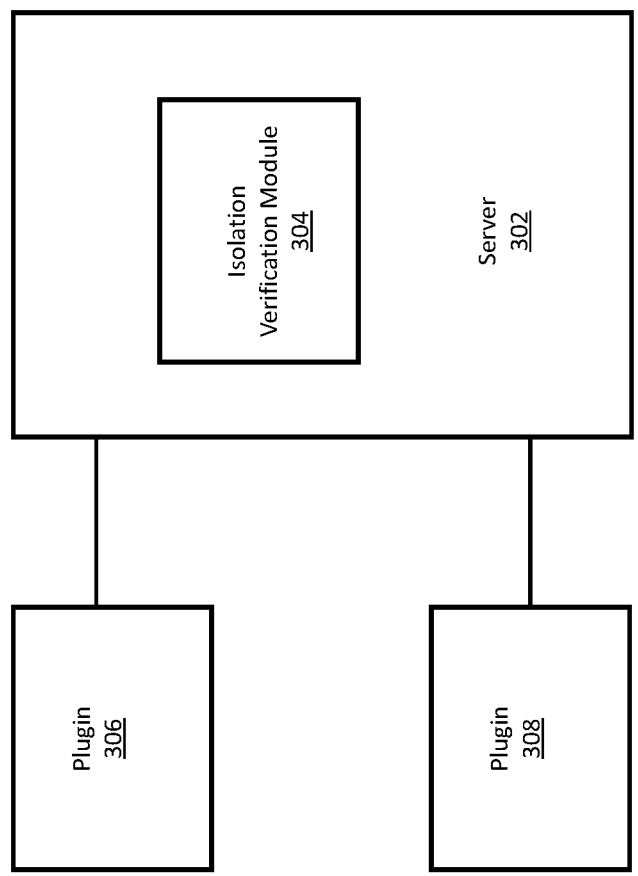
FIG. 3 illustrates an example of an isolation verification module configured to determine whether a plugin is sufficiently isolated with respect to other components or portions of a user interface.

FIG. 3 illustrates an example of an isolation verification module running on a server. FIG. 3 illustrates an isolation verification module 304 that may be implemented on a server 302. The server 302 may be a computing device and include a processor and memory. The isolation verification module 304 may be implemented as a virtual machine or as an application or in any other method for running a module on a computing device.

The isolation verification module 304 is configured to receive plugins 306 and 308. The isolation verification module 304 evaluates the plugins 306 and 308 to determine if the plugins 306 and 308 are sufficiently isolated. If necessary, the isolation verification module 304 may be configured to notify the developer that the plugin has passed or failed the isolation verification process. The isolation verification module 304 may also identify the reasons that the plugin has failed the isolation verification process.

Figure 4:
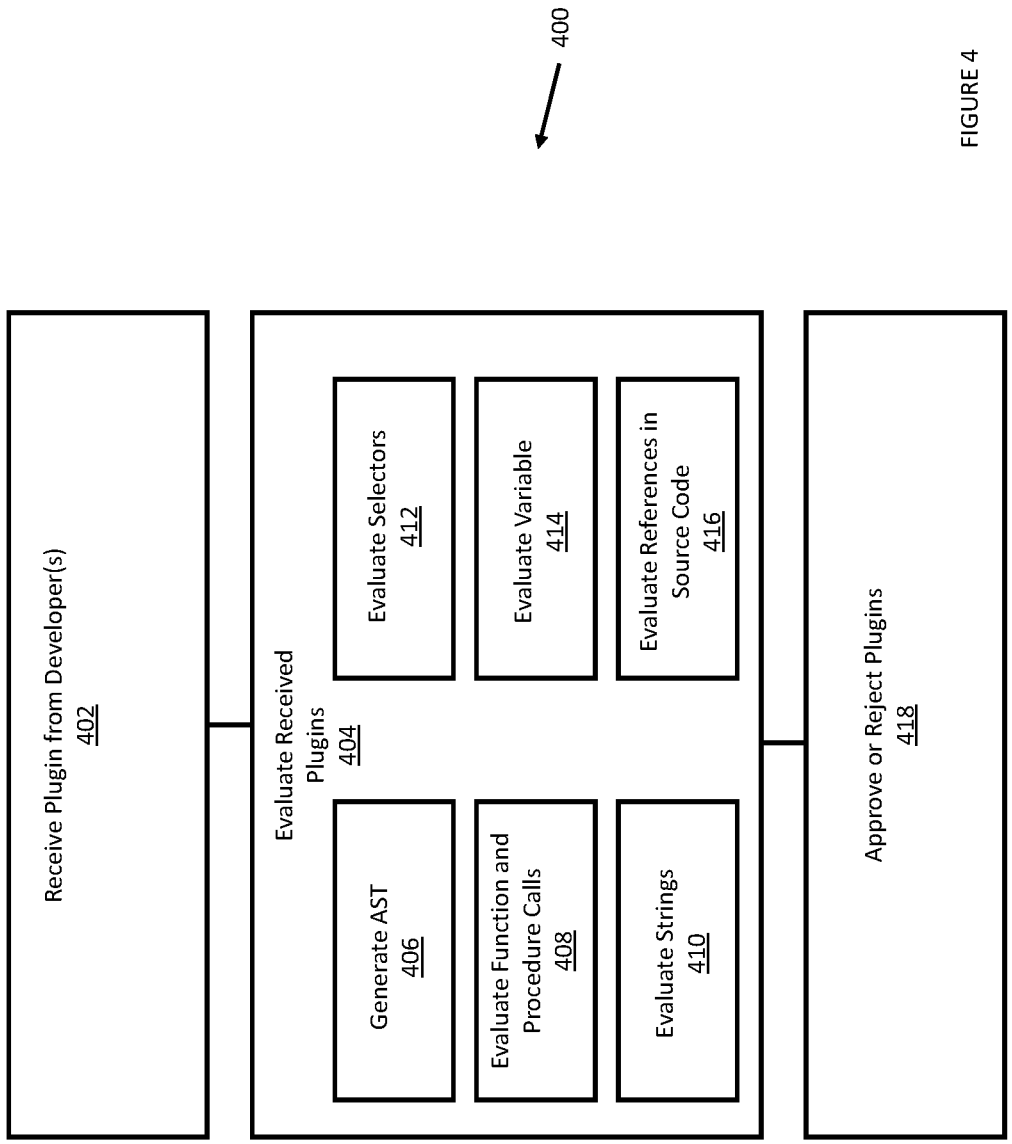
FIG. 4 illustrates an example of a flow diagram for evaluating a plugin in the context of the user interface.

FIG. 4 is a flow diagram illustrating an example isolation verification method. In box 402, a plugin is received, for example at an isolation verification server or device for evaluation by an isolation verification module operating on the isolation verification server. Multiple plugins may be received at the same time from the same or different developers. The same developer may submit multiple plugins.

In box 404, the plugin is evaluated. More specifically, the plugin is evaluated to determine whether the plugin is isolated with respect to other plugins or portions of the user interface. The plugin may be evaluated to determine if the plugin is sufficiently isolated from plugins generated by other developers and/or other plugins developed by the same developer.

In one example, a plugin is isolated if the plugin does not affect any other plugin or portion of the user interface in any way. In another example, a plugin is isolated if the plugin does not adversely affect any other plugin or portion of the user interface. In another example, a plugin may be isolated if the plugin only affects another plugin or portion of the user interface is a desirable or authorized manner. Evaluating the plugin includes at least evaluating all references in the plugin to ensure that the references exist within the plugin itself. References that are outside of the plugin may not be isolated and will be rejected at least temporarily. References outside the plugin may be determined to be allowable or authorized.

When evaluating the plugin, the source code or software (which may be in a programming language (source code) or executable form) may be transformed into a structure that can be interpreted by a computing device. By way of example only, the plugin may be transformed in box 406 by generating a syntax tree such as an abstract syntax tree (AST) or a parse tree. In one example, an AST represents the structure or essence of the source code. In one example, the generation of the AST or other structure may also be part of a compiling process. In effect, evaluating whether the plugin is isolated may include partially compiling the source code of the plugin. The AST or other transformation captures the expressions of the programming language into a structure or format that can be understood more readily by a computing device.

Figure 5:
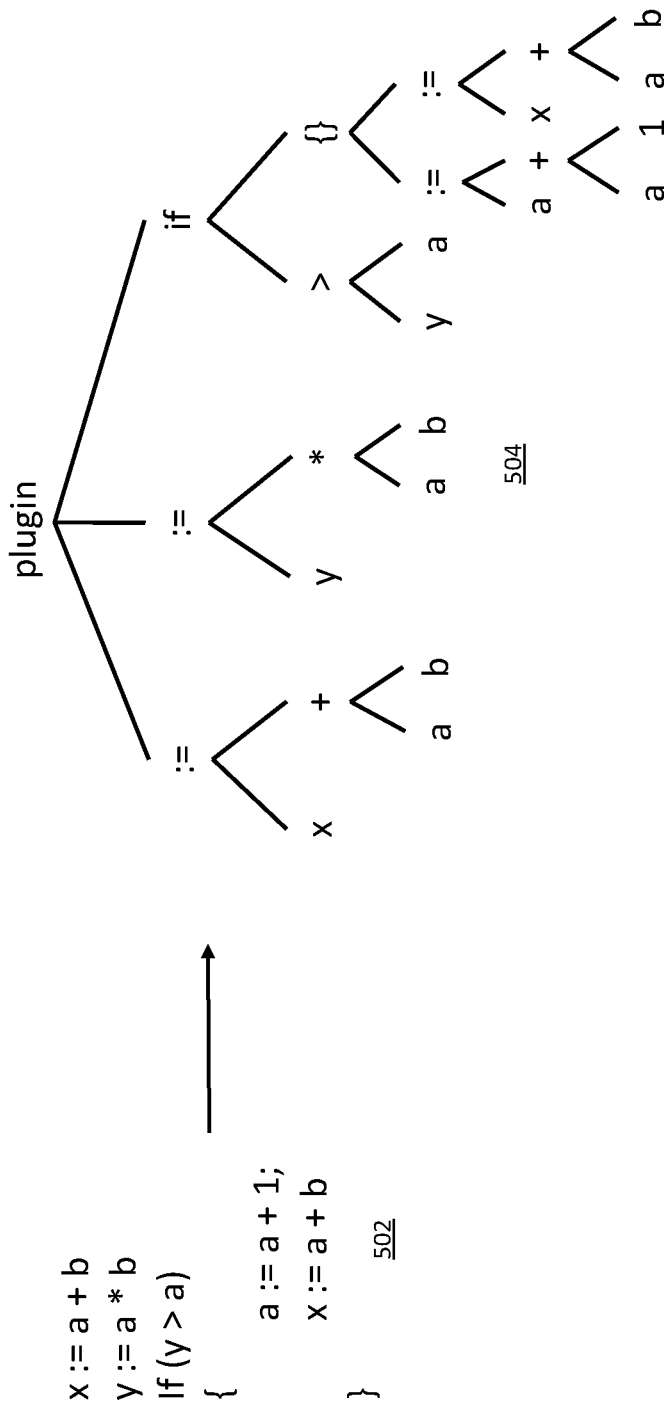
FIG. 5 illustrates an example of a structure used in performing isolation verification on a plugin.

A simple AST is illustrated in FIG. 5. FIG. 5 illustrates an example of source code 502 that is transformed into an AST 504. As shown in FIG. 5, the expressions of the source code 502 are captured in a format such that references therein can be more readily evaluated by a computing device.

The evaluation of the plugin continues by evaluating references detected in the AST. For example, the AST 504 illustrates several variables. If any of these variable are global variables, then the plugin may not be sufficiently isolated. If the variables are only used in the plugin, then the plugin is likely sufficiently isolated.

More specifically, the AST or other transformation structure is further evaluated to identify references included therein. In box 408, the function or procedure calls are evaluated. For example, a plugin that calls a function or procedure from another plugin may not be sufficiently isolated. A plugin that calls a function or procedure from another plugin is vulnerable to changes outside the control of the developer and outside the scope of the plugin. For example, if the referenced function or procedure is changed by the other developer, then this change will impact the function of the plugin being evaluated. As a result, plugins that reference functions or procedures that pertain to other plugins or portions of the user interface (or other application) violate the scope or isolation of the plugin. When isolation errors are detected, the plugin is usually rejected and the developer is apprised of the rejection.

In box 410, strings included in the plugin are evaluated. In one example, strings are evaluated to determine if they included references to user interface elements or source code. If these types of references are present in the strings, the source code of the plugin is reviewed to determine whether the referenced elements are present in the source code. If the elements referenced in the strings are included in the source code of the plugin, then the plugin may be isolated. If the referenced elements are not included in the source code of the plugin, then there may be an isolation error that should be further investigated by the developer.

In one example, the strings may be evaluated to determine if they include selectors such as CSS (Cascading Style Sheet) selectors or other types of selectors. Selectors are an example of references in the source code that are evaluated. The selectors are evaluated in box 412. Generally, a selector is an element in the source code that is used to select an element or portion of the user interface. A selector can be used to identify any element or content in the user interface that falls within the definition of the selector. By way of example and not limitation, selectors can be used to select classes, elements of a certain class, images, elements that have no children, text, videos, elements that have certain attributes, or the like. A selector can be used to identify patterns, content, attributes, or characteristics.

A CSS selector, for example, may identify content to be styled in accordance with the selector. If the selector of a plugin is too broad, the selector may select content of another plugin and style that content in an unwanted or unauthorized manner. Evaluating the selectors thus include evaluating the reference and/or the referenced or a selected elements. If an image is selected and the selector is limited to images within the scope of the source code of the plugin, then the plugin may be sufficiently isolated. Selectors that are too broad or that select content outside of the plugin itself may result in the plugin being rejected.

When the selector is too broad, more specifically, the selector may have an impact on elements that are outside of the plugin being evaluated. For example, a selector may select all images having a particular attribute. If images in the user interface associated with other plugins have this attribute, then the plugin may adversely affect those plugins or portions of the user interface. This may not be permissible from an isolation verification perspective.

Another example of evaluating strings is to determine whether other namespaces are referenced in the strings. References to namespaces belonging to the plugin indicate that the plugin is isolated. References to namespaces outside of the plugin indicate that the plugin is not isolated.

In box 414, variables are evaluated. If a plugin includes a change to a global variable, then the plugin may not be isolated. All variables included in the source code of the plugin can be similarly evaluated. Any variables that are not specific to the plugin may indicate that the plugin is not isolated.

In box 416, references included in the source code are evaluated. As previously stated, all references in the source code of the plugin, regardless of how the references are expressed, are evaluated to determine whether the plugin is isolated. For example, a plugin may reference a library that is new and has never been used. The isolation verification module may flag this reference for further evaluation. All references that cannot be resolved may be flagged for manual review. In box 418, the plugins are rejected or approved based on the evaluation.

Embodiments of the invention are able to accommodate changes to source code and user interface development tools. For example, source codes are usually changing, for example by adding new libraries, adapting to new standards, or the like. User interface isolation verification methods can adapt to these changes as they occur. When new source code is first encountered, for example, the user interface isolation verification may flag the new source code for evaluation. Once the isolation verification code is adapted to understand the new source code, the isolation verification process can evaluate it automatically.

References in the source code to libraries can also be evaluated. For example, if the source code redefines a library or a portion of a library or uses a library in an unauthorized manner, then the plugin may not be isolated. If a plugin provides its own library, however, changes to such a library may be acceptable.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing isolation verification, the method comprising:

receiving a plugin associated with a user interface at a server that includes an isolation verification module, wherein the user interface is associated with second plugins, wherein the isolation verification module is configured to determine whether the plugin is isolated with respect to the second plugins;

evaluating the plugin with respect to the second plugins, by the isolation verification module, in an automated manner by:
  transforming the plugin into a syntax tree by at least partially compiling source code of the plugin;
  detecting variables of the plugin from the syntax tree;
  identifying function calls included in the source code of the plugin from the syntax tree;
  identifying references to elements included in strings included the source code from the syntax tree;
  identifying references to libraries in the source code; and
  identifying selectors included in the source code from the syntax tree;

determining that the plugin is isolated with respect to the second plugins by:
  determining that the variables in the plugin are not used in the second plugins;
  determining that the function calls included in the source code of the plugin do not call a function or procedure included in source code of the second plugins;
  determining that the referenced elements in the strings are present in the source code of the plugin;
  determining that the referenced libraries are not redefined, wherein changes to a library provided by the plugin are acceptable; and
  determining that none of the selectors is configured to select content associated with the second plugins;

approving the plugin after determining that the plugin is isolated and rejecting the plugin when determining that the plugin is not isolated and providing a reason for rejecting the plugin; and generating the user interface using the second plugins and the plugin after the plugin is approved.

2. The method of claim 1, further comprising receiving the second plugins and evaluating the second plugins simultaneously to determine whether the multiple plugins are isolated with respect to each other and with respect to the plugin.

3. The method of claim 1, wherein the plugin is isolated when the impact of the plugin on the second plugins used in generating the user interface is authorized.

4. The method of claim 1, further comprising determining that the plugin is not isolated when one or more of:
  at least one of the variables is used in the second plugins;
  the plugin calls a function or procedure of the second plugins;
  the referenced elements in the strings are present in the source code of the second plugins; and
  at least one of the selectors is configured to select content associated with the second plugins.

5. The method of claim 1, further comprising:
  Identifying second references in the source code that are not included in the strings; and
  determining if the second references refer to the second plugins or other components of the user interface.

6. The method of claim 5, further comprising determining that the plugin is not isolated when the second references refer to the second plugins, libraries, or components of the user interface.

7. The method of claim 1, further comprising determining whether any of the variables are associated with the second plugins or whether any of the variables of the plugin are global variables.

8. The method of claim 7, further comprising determining that the plugin is isolated when use of the variables that are global variables or that are associated with the second plugins is authorized.

9. A method for performing isolation verification, the method comprising:
  receiving a plugin associated with a user interface from a developer wherein the plugin includes source code, wherein the user interface is associated with second plugins and each of the second plugins includes source code;
  transforming the plugin into a transformation structure by at least partially compiling the source code of the plugin;
  evaluating the transformation structure in an automated manner to determine if the plugin is isolated, wherein evaluating the transformation structure includes:
    detecting variables of the plugin from the transformation structure;
    identifying function calls included in the source code of the plugin from the transformation structure;
    identifying references to elements included in strings included the source code from the transformation structure;
    identifying references to libraries in the source code; and
    identifying selectors included in the source code from transformation structure;
  determining that the plugin is not isolated with respect to the second plugins by:
    determining that the variables are not used only within the plugin;
    determining that the function calls included in the source code of the plugin calls a function or procedure included in the source code of the second plugins;
    determining that the referenced elements in the strings are present in the source code of the second plugins;
    determining that at least one references in the source code is redefined by the source code; and
    determining that one or more of the selectors is configured to select content associated with the second plugins;
  approving the plugin when determining that the plugin is isolated and rejecting the plugin when determining that the plugin is not isolated and providing a reason for rejecting the plugin; and
  generating the user interface using the second plugins and the plugin after the plugin is approved.

10. The method of claim 9, wherein the plugin is isolated when an impact of the plugin on the other plugins is authorized.

11. The method of claim 9, wherein the transformation structure includes an abstract syntax tree.

12. The method of claim 10, further comprising evaluating the second plugins to determine whether the second plugins are isolated from each other.

13. The method of claim 10, further comprising determining that the plugin is isolated when one or more of:
  none of the variables is used in the second plugins;
  the plugin does not call a function or procedure of the second plugins;

the referenced elements in the strings are not present in the source code of the second plugins; and the selectors are configured to only select content inside of the plugin.

14. The method of claim 10, further comprising determining that the plugin is isolated when one of the variables is a global variable and use of the global variable is authorized.

15. The method of claim 10, wherein changes to a library or using the library in an unauthorized manner indicate that the plugin is not isolated.

16. The method of claim 10, determining that the plugin is isolated when only references to namespaces belonging to the plugin are made in the source code.

17. The method of claim 16, further comprising identifying a reason why the plugin is not isolated when the plugin is not approved and providing the reason to a developer.

18. A non-transitory storage medium having stored therein computer-executable instructions which, when executed by one or more hardware processors, perform the processes recited in claim 9.

19. A server, wherein the server comprises:
one or more hardware processors; and
the non-transitory storage medium as recited in claim 18.

20. A non-transitory computer readable medium having stored therein computer-executable instructions which, when executed by one or more hardware processors, implement a method for performing isolation verification, the method comprising:

developing a plugin by a first developer;

developing second plugins by a second developer, wherein the second plugins are developed separately from the plugin;

receiving the plugin associated with a user interface at a server that includes an isolation verification module, wherein the user interface is associated with the second plugins, wherein the isolation verification module is configured to determine whether the plugin is isolated with respect to the second plugins;

evaluating the plugin with respect to the second plugins, by the isolation verification module, in an automated manner by:

transforming the plugin into a syntax tree by at least partially compiling source code of the plugin;

detecting variables of the plugin from the syntax tree;

identifying function calls included in the source code of the plugin from the syntax tree;

identifying references to elements included in strings included the source code from the syntax tree;

identifying references to libraries in the source code; and identifying selectors included in the source code from the syntax tree;

determining that the plugin is isolated with respect to the second plugins by:

determining that the variables in the plugin are not used in the second plugins;

determining that the function calls included in the source code of the plugin do not call a function or procedure included in the source code of the second plugins;

determining that the referenced elements in the strings are present in the source code of the plugin;

determining that the referenced libraries are not redefined, wherein changes to a library provided by the plugin are acceptable; and determining that none of the selectors is configured to select content associated with the second plugins;

approving the plugin after determining that the plugin is isolated and rejecting the plugin when determining that the plugin is not isolated and providing a reason for rejecting the plugin; and generating the user interface using the second plugins and the plugin after the plugin is approved.

\* \* \* \* \*